US011837939B2

(12) United States Patent
Leonardi et al.

(10) Patent No.: US 11,837,939 B2
(45) Date of Patent: Dec. 5, 2023

(54) ELECTRIC MACHINE

(71) Applicant: FORD GLOBAL TECHNOLOGIES, LLC, Dearborn, MI (US)

(72) Inventors: Franco Leonardi, Dearborn Heights, MI (US); Prasad Dev Hanumalagutti, Dearborn, MI (US); Michael W. Degner, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 138 days.

(21) Appl. No.: 17/400,520

(22) Filed: Aug. 12, 2021

(65) Prior Publication Data

US 2023/0050604 A1    Feb. 16, 2023

(51) Int. Cl.
| | |
|---|---|
| *H02K 5/10* | (2006.01) |
| *H02K 5/20* | (2006.01) |
| *H02K 9/19* | (2006.01) |
| *H02K 7/00* | (2006.01) |
| *B60K 1/00* | (2006.01) |

(52) U.S. Cl.
CPC ............ *H02K 5/10* (2013.01); *B60K 1/00* (2013.01); *H02K 5/203* (2021.01); *H02K 7/006* (2013.01); *H02K 9/19* (2013.01); *H02K 2205/09* (2013.01)

(58) Field of Classification Search
CPC .. H02K 5/00; H02K 5/04; H02K 5/10; H02K 5/12; H02K 5/1285; H02K 5/132; H02K 5/225; H02K 5/203; H02K 7/006; H02K 9/19; H02K 2205/09; B60K 1/00

USPC ..................................................... 310/87, 88
See application file for complete search history.

(56) References Cited

U.S. PATENT DOCUMENTS

| | | | |
|---|---|---|---|
| 2012/0126642 A1* | 5/2012 | Miyamoto | H02K 3/24 310/54 |
| 2016/0118858 A1 | 4/2016 | Ojima et al. | |
| 2017/0279329 A1* | 9/2017 | Degner | H02K 9/19 |
| 2019/0238009 A1* | 8/2019 | Nakamura | H02K 1/20 |
| 2020/0389071 A1 | 12/2020 | Sakurada et al. | |

FOREIGN PATENT DOCUMENTS

CN    114744788 A  *  7/2022

OTHER PUBLICATIONS

CN-114744788-A (Year: 2022).*

* cited by examiner

*Primary Examiner* — Tulsidas C Patel
*Assistant Examiner* — Mohammed Ahmed Qureshi
(74) *Attorney, Agent, or Firm* — David B Kelley; Brooks Kushman P.C.

(57) ABSTRACT

An electric machine includes a housing, a stator, an oil film, and at least one first seal. The housing has an internal surface defining an internal cavity. The stator has an outer peripheral surface and is disposed within the internal cavity such that a clearance gap is defined between an outer peripheral surface and the internal surface. The oil film is disposed within the clearance gap and is in contact with the internal surface and the outer peripheral surface. The at least one first seal is disposed along a first end of the stator and is configured to retain the oil film within the clearance gap along the first end of the stator.

20 Claims, 5 Drawing Sheets

ELECTRIC MACHINE

TECHNICAL FIELD

The present disclosure relates to electric machines, particularly electric machines that are configured to propel an electric or hybrid vehicle.

BACKGROUND

Hybrid/electric vehicles may be propelled by an electric machine that draws power from a battery.

SUMMARY

An electric machine includes a housing, a stator core, an oil film, a first seal, and a second seal. The housing has an internal surface defining a central cavity. The stator core has first and second longitudinal ends. The stator core also has an external peripheral surface extending between the first and second longitudinal ends. The stator core is disposed within the central cavity such that the internal surface is positioned radially about the external peripheral surface. The oil film is disposed with a clearance gap defined between the internal surface and the external peripheral surface. The first seal is disposed along the first longitudinal end of the stator core and is configured to retain the oil film within the clearance gap along the first longitudinal end of the stator core. The second seal is disposed along the second longitudinal end of the stator core and is configured to retain the oil film within the clearance gap along the second longitudinal end of the stator core.

An electric machine includes a housing, a stator core, a first sealing system, and a second sealing system. The housing has an open end, an internal bottom surface, and an internal radial surface extending between the open end and the internal bottom surface. The internal bottom surface and the internal radial surface collectively define an internal cavity. The open end defines an opening to the cavity. The stator core has an external radial surface extending between first and second ends. The stator core is disposed within the internal cavity such that a clearance gap is defined between the internal radial surface and external radial surface. The first sealing system engages the open end of the housing and the first end of the stator core to isolate the clearance gap from external surroundings along the first end of the stator core. The second sealing system engages the internal bottom surface of the housing and the second end of the stator core to isolate the clearance gap from the external surroundings along the second end of the stator core.

An electric machine includes a housing, a stator, an oil film, and at least one first seal. The housing has an internal surface defining an internal cavity. The stator has an outer peripheral surface and is disposed within the internal cavity such that a clearance gap is defined between an outer peripheral surface and the internal surface. The oil film is disposed within the clearance gap and is in contact with the internal surface and the outer peripheral surface. The at least one first seal is disposed along a first end of the stator and is configured to retain the oil film within the clearance gap along the first end of the stator.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
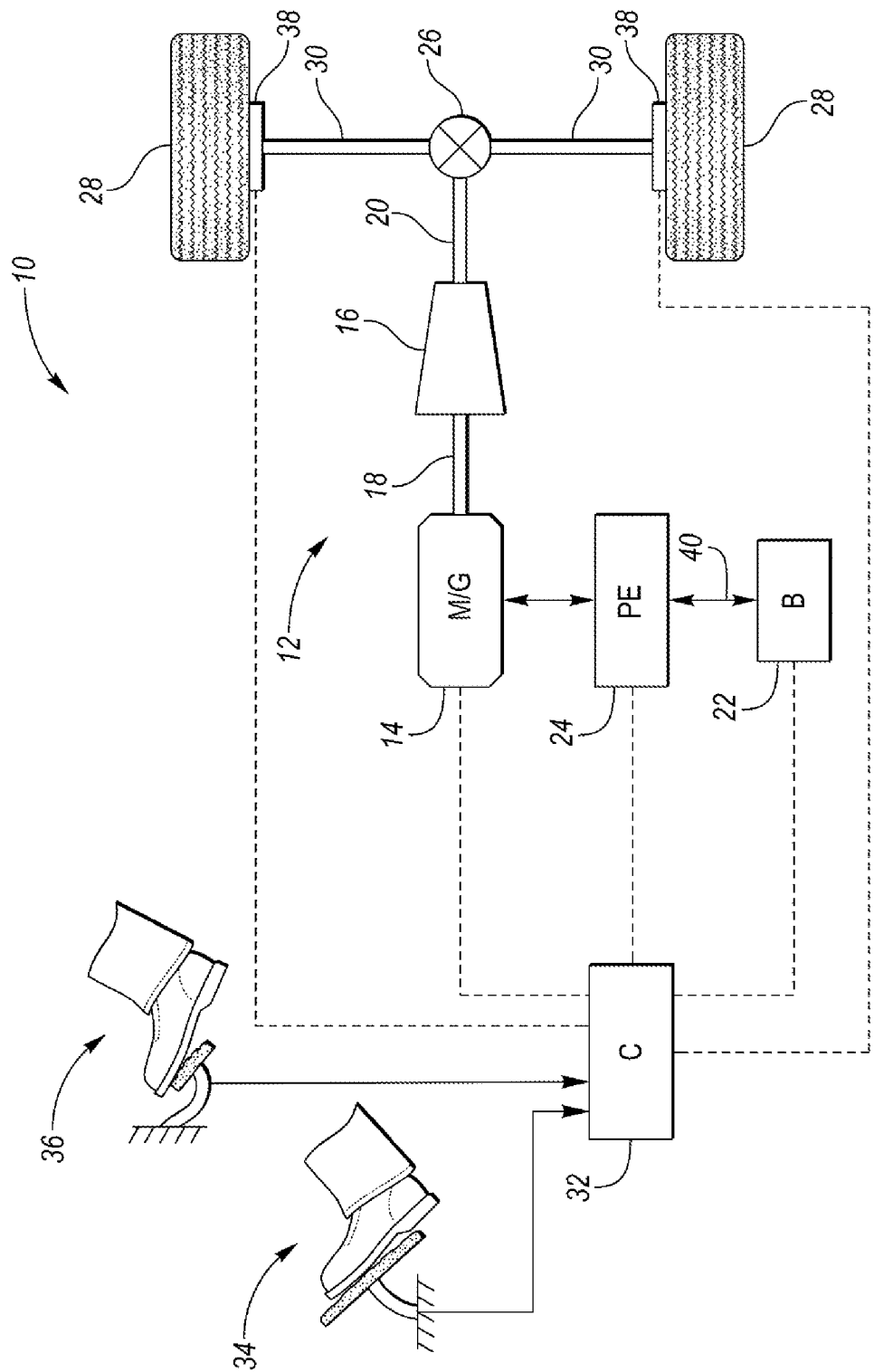
FIG. 1 is a schematic illustration of a representative powertrain of an electric vehicle.
Figure 2:
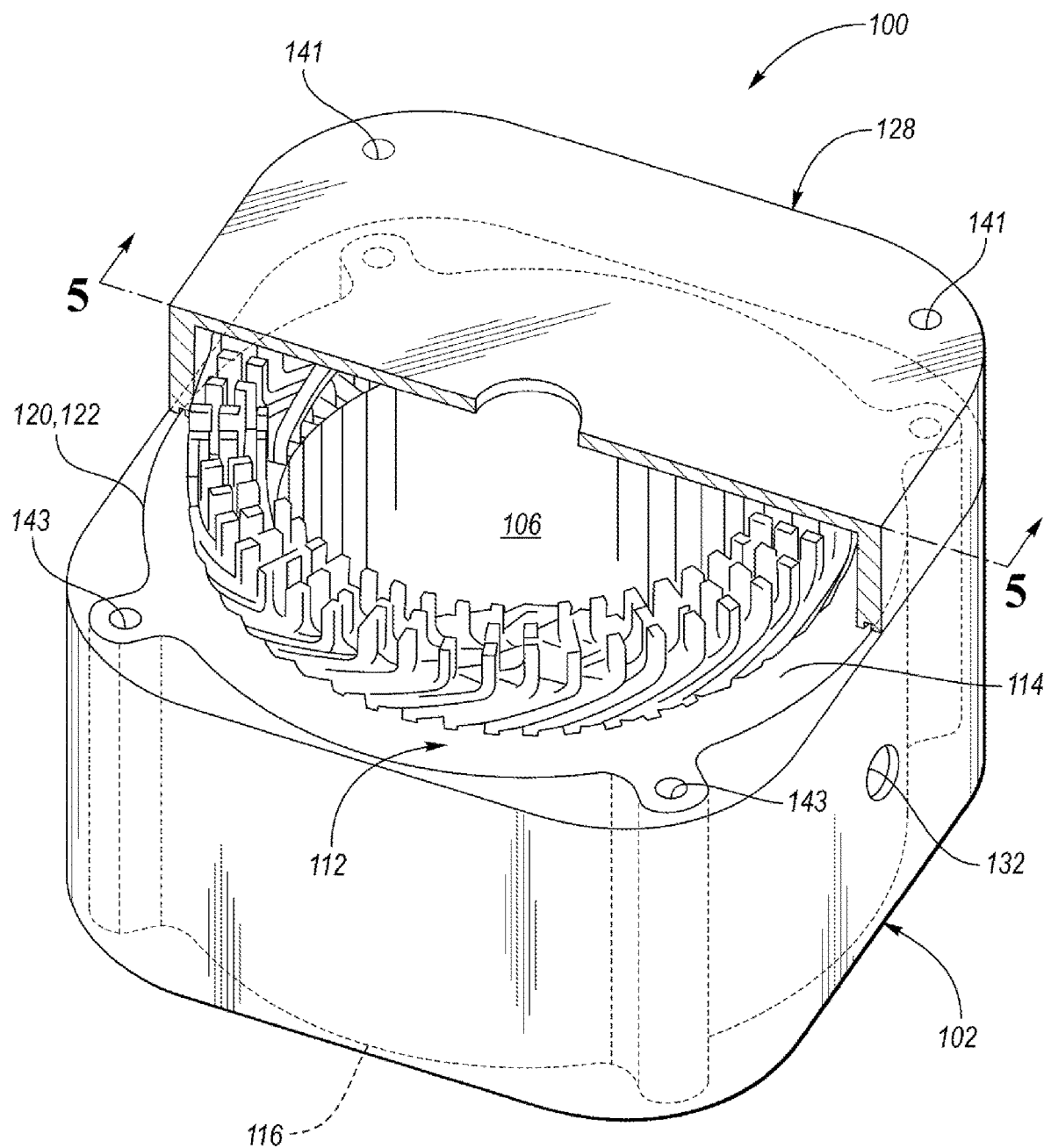
FIG. 2 is an isometric top view of an electric machine having a housing and a housing cover with a portion of the housing cover cutaway.
Figure 3:
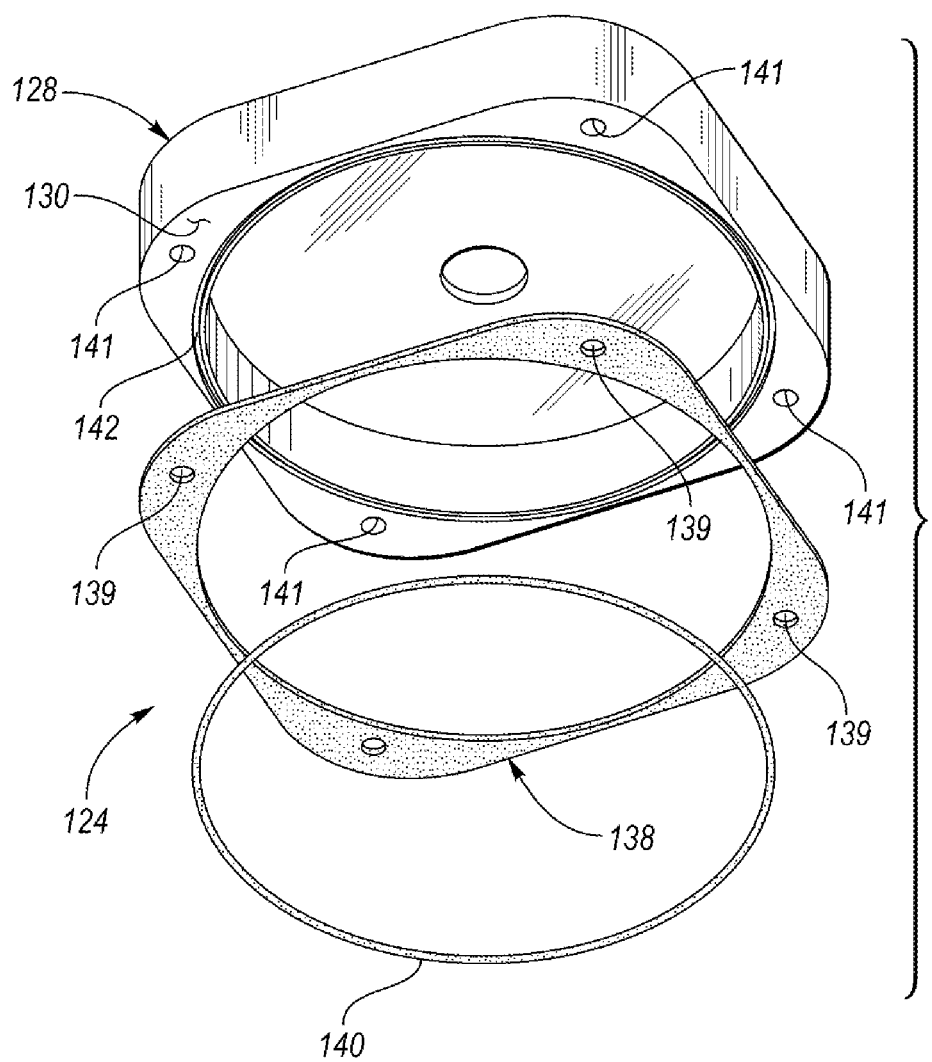
FIG. 3 is an exploded view of the housing cover of the electric machine and a first sealing system.
Figure 4:
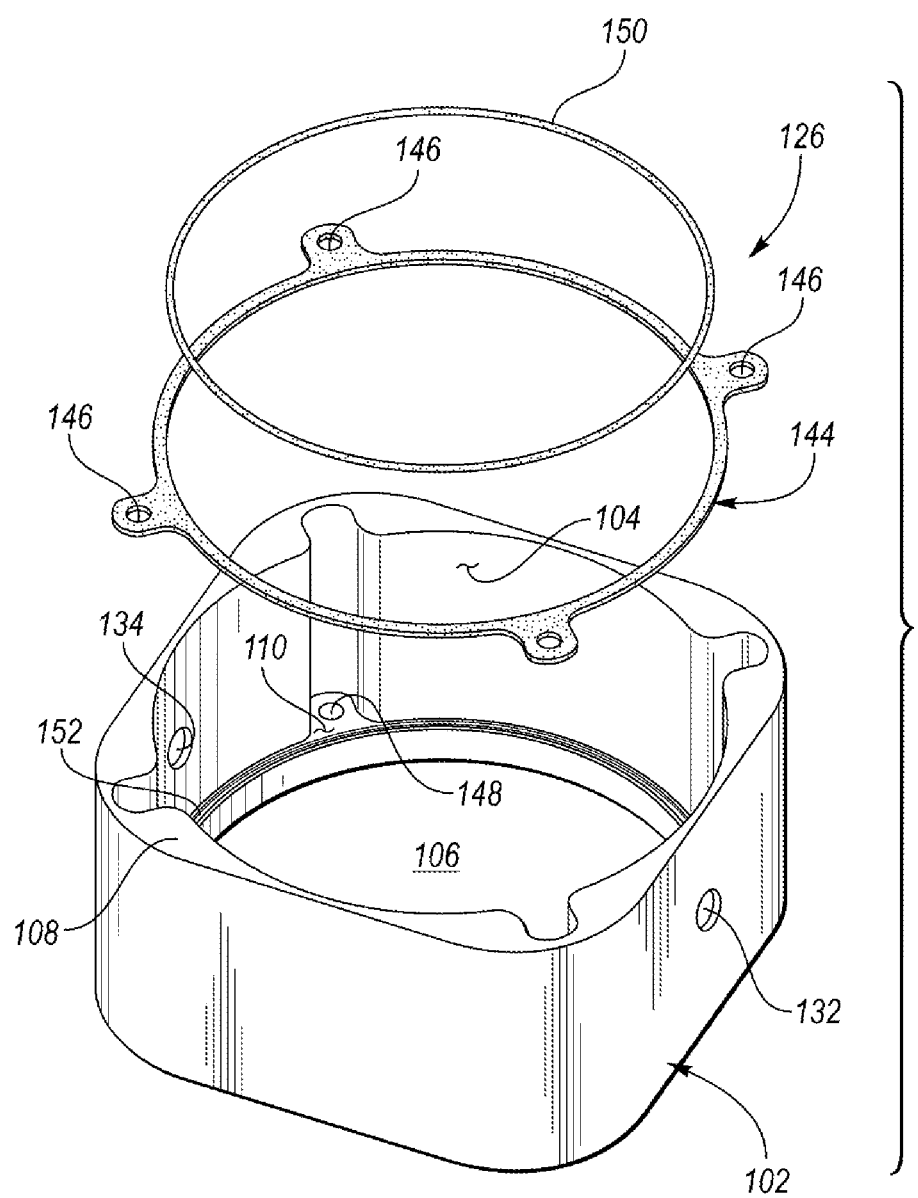
FIG. 4 is an exploded view of the housing of the electric machine and a second sealing system
Figure 5:
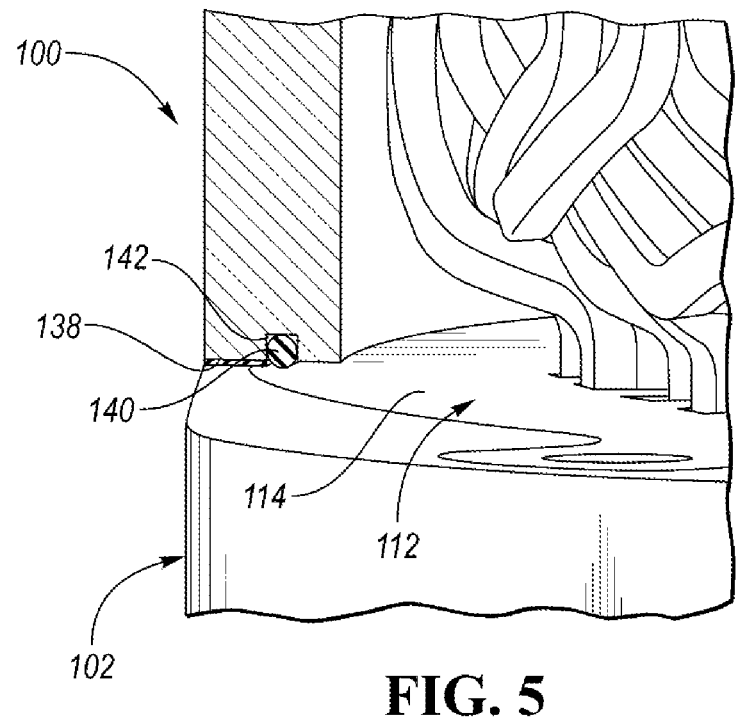
FIG. 5 is a partial cutaway view taken along line 5-5 in FIG. 2.
Figure 6:
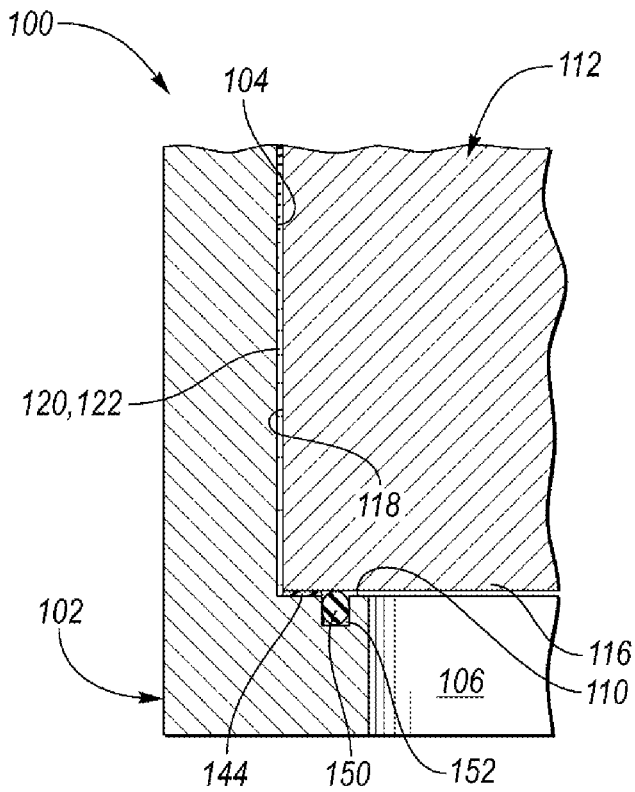
FIG. 6 is a partial cross-sectional view taken along line 5-5 in FIG. 2.

Referring to FIG. 1, a schematic diagram of an electric vehicle 10 is illustrated according to an embodiment of the present disclosure. FIG. 1 illustrates representative relationships among the components. Physical placement and orientation of the components within the vehicle may vary. The electric vehicle 10 includes a powertrain 12. The powertrain 12 includes an electric machine such as an electric motor/generator (M/G) 14 that drives a transmission (or gearbox) 16. More specifically, the M/G 14 may be rotatably connected to an input shaft 18 of the transmission 16. The transmission 16 may be placed in PRNDSL (park, reverse, neutral, drive, sport, low) via a transmission range selector (not shown). The transmission 16 may have a fixed gearing relationship that provides a single gear ratio between the input shaft 18 and an output shaft 20 of the transmission 16. A torque converter (not shown) or a launch clutch (not shown) may be disposed between the M/G 14 and the transmission 16. Alternatively, the transmission 16 may be a multiple step-ratio automatic transmission. An associated traction battery 22 is configured to deliver electrical power to or receive electrical power from the M/G 14.

The M/G 14 is a drive source for the electric vehicle 10 that is configured to propel the electric vehicle 10. The M/G 14 may be implemented by any one of a plurality of types of electric machines. For example, M/G 14 may be a permanent magnet synchronous motor. Power electronics 24 condition direct current (DC) power provided by the battery 22 to the requirements of the M/G 14, as will be described below. For example, the power electronics 24 may provide three phase alternating current (AC) to the M/G 14.

If the transmission 16 is a multiple step-ratio automatic transmission, the transmission 16 may include gear sets (not shown) that are selectively placed in different gear ratios by selective engagement of friction elements such as clutches and brakes (not shown) to establish the desired multiple discrete or step drive ratios. The friction elements are controllable through a shift schedule that connects and disconnects certain elements of the gear sets to control the ratio between the transmission output shaft 20 and the transmission input shaft 18. The transmission 16 is automatically shifted from one ratio to another based on various vehicle and ambient operating conditions by an associated controller, such as a powertrain control unit (PCU). Power and torque from the M/G 14 may be delivered to and received by transmission 16. The transmission 16 then provides powertrain output power and torque to output shaft 20.

It should be understood that the hydraulically controlled transmission 16, which may be coupled with a torque converter (not shown), is but one example of a gearbox or transmission arrangement; any multiple ratio gearbox that accepts input torque(s) from a power source (e.g., M/G 14) and then provides torque to an output shaft (e.g., output shaft 20) at the different ratios is acceptable for use with embodiments of the present disclosure. For example, the transmission 16 may be implemented by an automated mechanical (or manual) transmission (AMT) that includes one or more servo motors to translate/rotate shift forks along a shift rail to select a desired gear ratio. As generally understood by those of ordinary skill in the art, an AMT may be used in applications with higher torque requirements, for example.

As shown in the representative embodiment of FIG. 1, the output shaft 20 is connected to a differential 26. The differential 26 drives a pair of drive wheels 28 via respective axles 30 connected to the differential 26. The differential 26 transmits approximately equal torque to each wheel 28 while permitting slight speed differences such as when the vehicle turns a corner. Different types of differentials or similar devices may be used to distribute torque from the powertrain to one or more wheels. In some applications, torque distribution may vary depending on the particular operating mode or condition, for example.

The powertrain 12 further includes an associated controller 32 such as a powertrain control unit (PCU). While illustrated as one controller, the controller 32 may be part of a larger control system and may be controlled by various other controllers throughout the vehicle 10, such as a vehicle system controller (VSC). It should therefore be understood that the powertrain control unit 32 and one or more other controllers can collectively be referred to as a "controller" that controls various actuators in response to signals from various sensors to control functions such as operating the M/G 14 to provide wheel torque or charge the battery 22, select or schedule transmission shifts, etc. Controller 32 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle.

The controller 32 communicates with various vehicle sensors and actuators via an input/output (I/O) interface (including input and output channels) that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. As generally illustrated in the representative embodiment of FIG. 1, controller 32 may communicate signals to and/or receive signals from the M/G 14, battery 22, transmission 16, power electronics 24, and any another component of the powertrain 12 that may be included, but is not shown in FIG. 1 (i.e., a launch clutch that may be disposed between the M/G 14 and the transmission 16. Although not explicitly illustrated, those of ordinary skill in the art will recognize various functions or components that may be controlled by controller 32 within each of the subsystems identified above. Representative examples of parameters, systems, and/or components that may be directly or indirectly actuated using control logic and/or algorithms executed by the controller 32 include front-end accessory drive (FEAD) components such as an alternator, air conditioning compressor, battery charging or discharging, regenerative braking, M/G 14 operation, clutch pressures for the transmission gearbox 16 or any other clutch that is part of the powertrain 12, and the like. Sensors communicating input through the I/O interface may be used to indicate wheel speeds (WS1, WS2), vehicle speed (VS S), coolant temperature (ECT), accelerator pedal position (PPS), ignition switch position (IGN), ambient air temperature (e.g., ambient air temperature sensor 33), transmission gear, ratio, or mode, transmission oil temperature (TOT), transmission input and output speed, deceleration or shift mode (MDE), battery temperature, voltage, current, or state of charge (SOC) for example.

Control logic or functions performed by controller 32 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle and/or powertrain controller, such as controller 32. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

An accelerator pedal 34 is used by the driver of the vehicle to provide a demanded torque, power, or drive command to the powertrain 12 (or more specifically M/G 14) to propel the vehicle. In general, depressing and releasing the accelerator pedal 34 generates an accelerator pedal position signal that may be interpreted by the controller 32 as a demand for increased power or decreased power, respectively. A brake pedal 36 is also used by the driver of the vehicle to provide a demanded braking torque to slow the vehicle. In general, depressing and releasing the brake pedal 36 generates a brake pedal position signal that may be interpreted by the controller 32 as a demand to decrease the vehicle speed. Based upon inputs from the accelerator pedal 34 and brake pedal 36, the controller 32 commands the torque and/or power to the M/G 14, and friction brakes 38. The controller 32 also controls the timing of gear shifts within the transmission 16.

The M/G 14 may act as a motor and provide a driving force for the powertrain 12. To drive the vehicle with the M/G 14 the traction battery 22 transmits stored electrical energy through wiring 40 to the power electronics 24 that may include inverter and rectifier circuitry, for example. The inverter circuitry of the power electronics 24 may convert DC voltage from the battery 22 into AC voltage to be used by the M/G 14. The rectifier circuitry of the power electronics 24 may convert AC voltage from the M/G 14 into DC voltage to be stored with the battery 22. The controller 32 commands the power electronics 24 to convert voltage from the battery 22 to an AC voltage provided to the M/G 14 to provide positive or negative torque to the input shaft 18.

The M/G 14 may also act as a generator and convert kinetic energy from the powertrain 12 into electric energy to be stored in the battery 22. More specifically, the M/G 14 may act as a generator during times of regenerative braking in which torque and rotational (or kinetic) energy from the spinning wheels 28 is transferred back through the transmission 16 and is converted into electrical energy for storage in the battery 22.

It should be understood that the vehicle configuration described herein is merely exemplary and is not intended to be limited. Other electric or hybrid electric vehicle configurations should be construed as disclosed herein. Other electric or hybrid vehicle configurations may include, but are not limited to, series hybrid vehicles, parallel hybrid vehicles, series-parallel hybrid vehicles, plug-in hybrid electric vehicles (PHEVs), fuel cell hybrid vehicles, battery operated electric vehicles (BEVs), or any other vehicle configuration known to a person of ordinary skill in the art.

In hybrid configurations that include an internal combustion engine such as a gasoline, diesel, or natural gas powered engine, or a fuel cell, the controller 32 may be configured to control various parameters of such an internal combustion engine. Representative examples of internal combustion parameters, systems, and/or components that may be directly or indirectly actuated using control logic and/or algorithms executed by the controller 32 include fuel injection timing, rate, and duration, throttle valve position, spark plug ignition timing (for spark-ignition engines), intake/exhaust valve timing and duration, etc. Sensors communicating input through the I/O interface from such an internal combustion engine to the controller 32 may be used to indicate turbocharger boost pressure, crankshaft position (PIP), engine rotational speed (RPM), intake manifold pressure (MAP), throttle valve position (TP), exhaust gas oxygen (EGO) or other exhaust gas component concentration or presence, intake air flow (MAF), etc.

It should be understood that the schematic illustrated in FIG. 1 is merely representative and is not intended to be limiting. Other configurations are contemplated without deviating from the scope of the disclosure. For example, the vehicle powertrain 12 may be configured to deliver power and torque to the one or both of the front wheels as opposed to the illustrated rear wheels 28.

Referring to FIGS. 2-6, an electric machine 100 (e.g., M/G 14) and subcomponents of the electric machine 100 are illustrated in further detail. The electric machine 100 has a housing 102. The housing 102 has an internal radial surface 104 that defines an internal cavity 106. The internal radial surface 104 may simply be referred to as the internal surface and the internal cavity 106 may also be referred to as the central cavity. The housing 102 may further include an open end 108 and an internal bottom surface 110. The internal bottom surface 110 may be positioned at an opposing end of the housing 102 relative to the open end 108. The internal bottom surface 110 may also be referred to as the second internal surface. The internal radial surface 104 may extend between the open end 108 and the internal bottom surface 110. The internal bottom surface 110 and the internal radial 104 surface may collectively define the internal cavity 106. The open end 108 may define an opening to the internal cavity 106.

A stator core 112 is disposed within the internal cavity 106. The stator core 112 has a first end 114 and a second end 116. The first end 114 and the second end 116 may be referred to as first and second longitudinal ends, respectively. The stator core 112 may also include an external radial surface 118 extending between the first end 114 and the second end 116. The external radial surface 118 may also be referred to as the external peripheral surface or the outer peripheral surface. The stator core 112 may be disposed within the internal cavity 106 such that the internal radial surface 104 of the housing 102 is positioned radially about the external radial surface 118 of the stator core 112. A space or clearance gap 120 may be defined between the internal radial surface 104 of the housing 102 and the external radial surface 118 of the stator core 112.

An oil film 122 may be disposed within the clearance gap 120 between the internal radial surface 104 of the housing 102 and the external radial surface 118 of the stator core 112. The oil film 122 may be in contact with both the internal radial surface 104 of the housing 102 and the external radial surface 118 of the stator core 112. The oil film 122 may fill the entire space between the internal radial surface 104 of the housing 102 and the external radial surface 118 of the stator core 112. The oil film 122 reduces the thermal resistance between housing 102 and the stator core 112, which increases heat transfer from the electric machine 100, allowing the electric machine 100 to operate at lower and more efficient operating temperatures.

In order to retain the oil film 122 within the clearance gap 120 such that the oil film 122 coats the entire external radial surface 118 of the stator core 112 to increase heat transfer, the oil film 122 must be sealed within the clearance gap 120. A first sealing system 124 engages the open end 108 of the housing 102 and the first end 114 of the stator core 112 to isolate the clearance gap 120 from the external surroundings along the first end 114 of the stator core 112 and to retain the oil film 122 within the clearance gap 120 along the first end 114 of the stator core 112. The first sealing system 124 may include a single seal or multiple seals. A second sealing system 126 engages the internal bottom surface 110 of the housing 102 and the second end 116 of the stator core 112 to isolate the clearance gap 120 from the external surroundings along the second end 116 of the stator core 112 and to retain the oil film 122 within the clearance gap 120 along the second end 116 of the stator core 112. The second sealing system 126 may include a single seal or multiple seals. The electric machine 100 may further include a cover 128 disposed over the open end 108. The first sealing system 124 may further engage a lower surface 130 of the cover 128 to retain the oil film 122 within the clearance gap 120 along the first end 114 of the stator core 112.

The housing 102 may define an oil feed orifice 132 and an oil drain orifice 134. Each of the oil feed orifice 132 and the oil drain orifice 134 may extend from an exterior or exterior surface 136 of the housing to the internal radial surface 104. The oil feed orifice 132 and the oil drain orifice 134 may be positioned on opposite or opposing sides of the housing 12. Oil may be fed into the oil feed orifice 132 while the oil drain orifice 134 operates as a vent, or vice versa, while the oil film 122 is being flowed or pumped into the clearance gap 120. Oil may be continuously pumped into and out of the clearance gap 120 via the oil feed orifice 132 and the oil drain orifice 134, respectively to cool the electric machine 100, and more specifically, to cool the stator core 112. Alternatively, once the oil film 122 has filed the entire space between the internal radial surface 104 of the housing 102 and the external radial surface 118 of the stator core 112, the oil feed orifice 132 and the oil drain orifice 134 may each be capped with a plug (not shown) to retain the oil film 122 within the clearance gap 120. The oil feed orifice 132 and the oil drain orifice 134 may be tapped holes and the plugs may include threads.

The first sealing system 124 may include a gasket 138 disposed on the lower surface 130 of the cover 128. The gasket 138 may define orifices 139 that align with fastener receiving orifices 141 defined by the cover 128 and faster receiving orifices 143 defined by the stator 112. The first sealing system 124 may include the gasket 138 alone or may further include an O-ring 140 disposed within a groove 142 defined along the lower surface 130 of the cover 128. In embodiments that do not include the O-ring 140, the groove 142 may be omitted. Alternatively, a surface coating, such as but not limited to a room-temperature-vulcanizing (RTV) silicone, may be disposed on the lower surface 130 of the cover 128 instead of the gasket 138. In such an alternative, the first sealing system 124 may include the surface coating alone or may further include the O-ring 140. The combination of seals (e.g., gaskets, O-rings, surface coatings, etc.) that form the first sealing system 124 may engage the first end 114 of the stator core 112, the open end 108 of the housing 102, and the lower surface 130 of the cover 128, and may straddle the clearance gap 120, to retain the oil film 122 within the clearance gap 120 along the first end 114 of the stator core 112.

The second sealing system 126 may include a gasket 144 disposed on the internal bottom surface 110 of the housing 102. The gasket 144 may define orifices 146 that align with fastener receiving orifices 148 defined by the housing 102 and the faster receiving orifices 143 defined by the stator 112. The second sealing system 126 may include the gasket 144 alone or may further include an O-ring 150 disposed within a groove 152 defined along the bottom surface 110 of the housing 102. In embodiments that do not include the O-ring 150, the groove 152 may be omitted. Alternatively, a surface coating, such as but not limited to a room-temperature-vulcanizing (RTV) silicone, may be disposed on bottom surface 110 of the housing 102 instead of the gasket 144. In such an alternative, the second sealing system 126 may include the surface coating alone or may further include the O-ring 150. The combination of seals (e.g., gaskets, O-rings, surface coatings, etc.) that form the second sealing system 126 may engage the second end 116 of the stator core 112 and the bottom surface 110 of the housing 102, and may be disposed between the clearance gap 120 and the internal cavity 106 to retain the oil film 122 within the clearance gap 120 along the first end 114 of the stator core 112.

It should be understood that the designations of first, second, third, fourth, etc. for any component, state, or condition described herein may be rearranged in the claims so that they are in chronological order with respect to the claims.

The words used in the specification are words of description rather than limitation, and it is understood that various changes may be made without departing from the spirit and scope of the disclosure. As previously described, the features of various embodiments may be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. As such, embodiments described as less desirable than other embodiments or prior art implementations with respect to one or more characteristics are not outside the scope of the disclosure and may be desirable for particular applications.

What is claimed is:

1. An electric machine comprising:
   a housing having an internal surface facing radially inward and defining a central cavity;
   a stator core having (i) first and second longitudinal ends and (ii) an external peripheral surface facing radially outward and extending between the first and second longitudinal ends, wherein the stator core is disposed within the central cavity such that (i) the internal surface is positioned radially about the external peripheral surface, (ii) a clearance gap is defined between the internal surface and the external peripheral surface, (iii) an external end surface of the stator core is flush with an external end surface of the housing along the first longitudinal end, and (iv) the clearance gap separates the external end surface of the stator core from the external end surface of the housing;
   an oil film disposed within the clearance gap;
   a first seal disposed along the first longitudinal end of the stator core, wherein the first seal (i) spans between the external end surface of the stator core and the external end surface of the housing and (ii) covers the clearance gap along the first longitudinal end of the stator core to retain the oil film within the clearance gap along the first longitudinal end of the stator core; and
   a second seal disposed along the second longitudinal end of the stator core and configured to retain the oil film within the clearance gap along the second longitudinal end of the stator core.

2. The electric machine of claim 1, wherein (i) the housing has an open end that defines an opening to the central and (ii) the external end surface of the housing is positioned along the open end.

3. The electric machine of claim 2 further comprising a cover disposed over the open end, wherein the first seal further engages a lower exterior surface of the cover.

4. The electric machine of claim 3, wherein the first seal includes (i) a gasket disposed on the lower exterior surface of the cover and (ii) an O-ring disposed within a groove defined along the lower exterior surface of the cover, wherein the O-ring is (a) concentric with the gasket, (b) longitudinally aligned with the gasket, and (c) radially inward of the gasket.

5. The electric machine of claim 2, wherein the housing has a second internal surface (i) that partially defines the central cavity, (ii) is positioned opposite of the open end, and (iii) is perpendicular to the internal surface.

6. The electric machine of claim 5, wherein the second seal engages the second internal surface of the housing and the second longitudinal end of the stator core to retain the oil film within the clearance gap along the second longitudinal end of the stator core.

7. The electric machine of claim 6, wherein the second seal includes (i) a gasket disposed on the second internal surface of the housing and (ii) an O-ring disposed within a groove defined by the second internal surface, wherein the O-ring is (a) concentric with the gasket, (b) longitudinally aligned with the gasket, and (c) radially inward of the gasket.

8. The electric machine of claim 1, wherein (i) the external end surface of the stator core is perpendicular to the external peripheral surface and (ii) the external end surface of the housing is perpendicular to the internal surface.

9. An electric machine comprising:
   a housing having an open end, an internal bottom surface, and an internal radial surface extending between the open end and the internal bottom surface, wherein the internal bottom surface and the internal radial surface collectively define an internal cavity, (ii) the internal bottom surface is perpendicular to the internal radial surface, and (iii) the open end defines an opening to the cavity;
   a stator core having an external radial surface extending between first and second ends, wherein the stator core is disposed within the internal cavity such that aa clearance gap is defined between the internal radial surface and external radial surface, (ii) an external end surface of the stator core is flush with an external end surface of the housing along the first end, and (iii) the clearance gap separates the external end surface of the stator core from the external end surface of the housing;
   a first sealing system disposed along the first end of the stator core, wherein the first sealing system (i) spans between the external end surface of the stator core and the external end surface of the housing and (ii) covers the clearance gap along the first end of the stator core to isolate the clearance gap from external surroundings along the first end of the stator core; and
   a second sealing system engaging the internal bottom surface of the housing and the second end of the stator core to isolate the clearance gap from the external surroundings along the second end of the stator core.

10. The electric machine of claim 9 further comprising a cover disposed over the open end, wherein the first sealing system further engages a lower exterior end of the cover.

11. The electric machine of claim 10, wherein the first sealing system includes (i) a seal disposed on a lower surface of the cover and (ii) an O-ring disposed within a groove defined along the lower surface of the cover, wherein the O-ring is (a) concentric with the seal, (b) longitudinally aligned with the seal, and (c) radially inward of the seal.

12. The electric machine of claim 9 further comprising an oil film disposed within the clearance gap and in contact with the internal radial surface and the external radial surface.

13. The electric machine of claim 9, wherein (i) the external end surface of the stator core is perpendicular to the external radial surface and (ii) the external end surface of the housing is perpendicular to the internal radial surface.

14. The electric machine of claim 9, wherein the second sealing system includes (i) a seal disposed on the internal bottom surface of the housing and (ii) an O-ring disposed within a groove defined by the internal bottom surface, wherein the O-ring is (a) concentric with the seal, (b) longitudinally aligned with the seal, and (c) radially inward of the seal.

15. An electric machine comprising:
   a housing having an internal surface defining an internal cavity;
   a stator having an outer peripheral surface and disposed within the internal cavity such that (i) a clearance gap is defined between an outer peripheral surface and the internal surface, (ii) an external end surface of the stator is flush with an external end surface of the housing along a first end of the stator, and (ii) the clearance gap separates the external end surface of the stator core from the external end surface of the housing;
   an oil film disposed within the clearance gap and in contact with the internal surface and the outer peripheral surface; and
   at least one first seal disposed along the first end of the stator wherein the at least one first seal (i) spans between the external end surface of the stator and the external end surface of the housing and (ii) covers the clearance gap along the first end of the stator to retain the oil film within the clearance gap along the first end of the stator.

16. The electric machine of claim 15 further comprising at least one second seal disposed along a second end of the stator and configured to retain the oil film within the clearance gap along the second end of the stator.

17. The electric machine of claim 16, wherein the at least one first seal includes at least one of (i) a coating on a lower surface of a housing end cover, (ii) a gasket disposed on the end cover, or (iii) an O-ring disposed within a groove defined by the end cover, and wherein the at least one second seal includes at least one of (i) a coating on a second internal surface of the housing that partially defines the internal cavity, (ii) a gasket disposed on the second internal surface, or (iii) an O-ring disposed within a groove defined by the second internal surface.

18. The electric machine of claim 16, wherein the at least one second seal includes (i) a seal disposed on an internal bottom surface of the housing and (ii) an O-ring disposed within a groove defined along the internal bottom surface, wherein the O-ring is (a) concentric with the seal, (b) longitudinally aligned with the seal, and (c) radially inward of the seal.

19. The electric machine of claim 15, wherein (i) the external end surface of the stator is perpendicular to the outer peripheral surface and (ii) the external end surface of the housing is perpendicular to the internal surface.

20. The electric machine of claim 15, wherein the at least one first seal includes (i) a seal disposed on a lower surface of a cover and (ii) an O-ring disposed within a groove defined along a lower surface of the cover, wherein the O-ring is (a) concentric with the seal, (b) longitudinally aligned with the seal, and (c) radially inward of the seal.

* * * * *